MAGNETIC LOGICAL MEMORY DEVICE

Filed Aug. 10, 1966 4 Sheets-Sheet 4

United States Patent Office 3,555,524

Patented Jan. 12, 1971

3,555,524
MAGNETIC LOGICAL MEMORY DEVICE

Evgeny Ivanovich Ilyashenko, Bolshaya Zjuzinskaya ulitsa 13, korp. 1, kv. 120; Vladimir Fedorovich Rudakov, Shmitovsky proezd 11-a, kv. 57; and Boris Sergeevich Bekin, Ulitsa Stanislavskogo 22, kv. 3, all of Moscow, U.S.S.R.

Filed Aug. 10, 1966, Ser. No. 571,523
Int. Cl. G11c *11/08;* H03k *19/166*
U.S. Cl. 340—174 11 Claims

ABSTRACT OF THE DISCLOSURE

A two-aperture memory device, made of magnetic material and provided with output signal, nondestructive interrogation, writing and destructive readout windings, to perform nondestructive interrogation using the reversible remanent component and to carry out in the interrogation the logical operations between stored and interrogated information; there being two cores arranged in one plane or in mutually perpendicular planes and having a common crosspiece portion, whereas the flux-path cross-sectional areas of the first core and of the second core are equal to the cross-sectional area of the common crosspiece portion.

The present invention relates to magnetic memory devices, and more particularly to devices combining functions of storage and logic with nondestructive readout of information.

Storage elements with nondestructive readout were proposed hitherto, such as four-aperture core, transfluxor biaxial and other elements.

It is also known to combine storage and logical functions in its same devices. Devices for performing these operations employ two cores. However, for the purpose of performing, for instance, the EXCLUSIVE OR logical operation, these devices prove complex and involve difficulties in arranging a memory system.

In addition, a three-aperture core is known which operates on the transfluxor principle and performs the EXCLUSIVE OR operation. This core is of low speed and requires close regulation of writing and reading currents.

It is an object of the present invention to provide a device combining functions of storage and logic with nondestructive readout and capable particularly of performing the EXCLUSIVE OR logical operation for stored and interrogation information.

It is another object of the present invention to provide high speed in operation of devices (over 1 megacycle per second).

It is still another object of the present invention to provide a device with a high signal-to-noise ratio (also for extremely steep edges of interrogation pulses).

The advantage of the devices proposed herein consists in that writing and destructive readout are effected in them in the same manner as in conventional toroidal cores.

Other objects and advantages will be apparent from the following description and accompanying drawings, in which:

FIGS. 1*a*, 1*b* show two modifications of the invention (general view);

FIGS. 2*a*, 2*b* illustrate schematiaclly the operating principle of a device shown in FIG. 1*a*;

FIG. 3 shows an associate memory cell;

FIGS. 4*a*, 4*b*, 4*c* show versions of the device performing the EXCLUSIVE OR logical operation for interrogation and stored information;

Figure 1A:
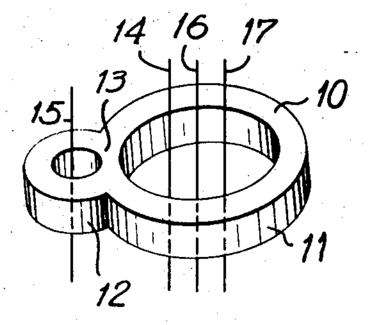

Let us consider FIG. 1*a* which illustrates one of the versions of the invention.

Shown at 10 is a memory device consisting of two cores 11 and 12 which are located in one plane and have common portion 13. If this device is to be used in memory systems with threshold writing it must be fabricated of magnetic material with a rectangular hysteresis loop. For purposes other than indicated above it is possible to employ material with a nonrectangular hysteresis loop.

Information is written into the device by any of the known methods as into a conventional core made of magnetic material and having the dimensions of said core 11. Write winding 14 passes through an aperture in core 11.

Nondestructive readout is effected by sending current pulses through winding 15 which passes through the aperture in core 12.

Readout output signals are taken off output winding 16 which passes through the aperture in core 11.

For destructive reading of information winding 17 is used which also passes through the aperture in core 11.

The invention is, however, not limited to the said mutual location of the cores in one plane.

Figure 1B:
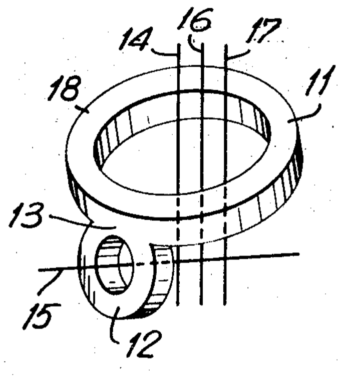

The present invention includes also such a verision 18 where cores 11 and 12 with common portion 13 are located in perpendicular planes as illustrated in FIG. 1*b* and the core axes intersect at right angles. Windings 14, 15, 16, 17 perform the same functions as in FIG. 1*a*. In this case, however, interrogation winding 15 may be arranged perpendicular to output winding 16 which reduces the inductive coupling between said windings and, consequently, the magnitude of inductive noise in the output winding due to interrogation signals.

The operating principle of the device will now be described with reference to FIGS. 2*a*, 2*b*.

Figure 2A:
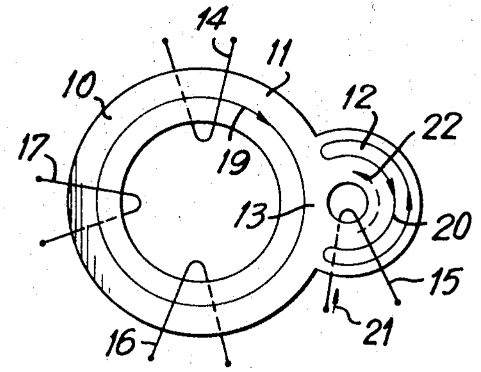

Arrows 19 and 20 of FIG. 2*a* show the directions of residual magnetic fluxes in respective branches of storage element 10 upon termination of writing, for example, of a binary "1."

Closed arrow 20 shows conventionally the demagnetized state of the branch of core 12. Such distribution of fluxes will be true if a write pulse of a "1" follows the write pulse of a "0" and if cross-sectional areas of cores 11 and 12 and of common portion 13 are equal.

Now the application of an interrogation current to winding 15 in the direction of arrow 21 produces a flux, said flux flowing in core 12 in the direction of dotted arrow 22. This flux closes partially around the aperture in core 12 and partially around the aperture in core 11, thus weakening the residual flux in said core.

The flux is weakened in core 11 due to the fact that the dynamic permeability of this core (except for common portion 13) is great for the field set up by the interrogation current.

A decrease in the flux results in a relatively large output signal induced in winding 16.

If the interrogation ampere-turns do not exceed a definite value, the flux in core 11, with the interrogation current pulse ceasing, is restored to a value close to the original one due to the reversibility of magnetization.

Further interrogation produces such a condition under which the flux in core 11 does not decrease any more. If the interrogation ampere-turns exceed a certain threshold value the information written in core 11 is partially destroyed, that is, the residual flux in this core decreases.

Mode WRITING-PARTIALLY DESTRUCTIVE

READING TROUGH APERTURE IN CORE 12 is characterized by a very high signal-to-noise ratio (also for rather steep edges of the interrogation current pulses).

An essential feature of memory devices shown in FIGS. 1*a*, 1*b* is that an appreciable increase in interrogation ampere-turns cannot reverse the write residual flux, since the saturation of core 12 is attained earlier than the residual flux in core 12 is reversed.

Figure 2B:
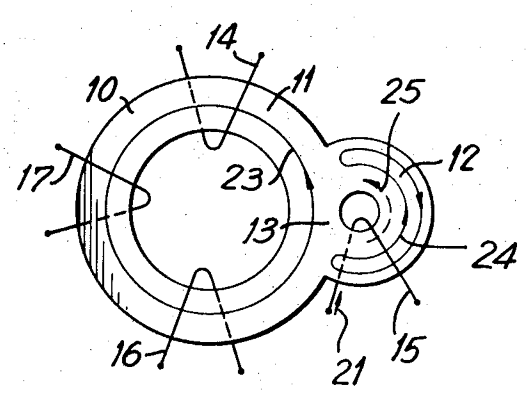

In FIG. 2*b* arrows 23 and 24 show the directions of residual magnetic fluxes in respective branches of the cores after a binary "0" has been written.

Here, the application of interrogation current to winding 15 in the former direction produces a flux, said flux flowing in core 12 in the direction of dotted arrow 25. This interrogation flux cannot weaken the flux in core 11 (except for common portion 13) as the dynamic permeability of this core is small for the field set up by the interrogation current (in case of material with the rectangular hysteresis loop, dynamic permeability 0). As a result, a relatively weak signal (noise) is induced in output winding 16.

If now the interrogation current is reversed in winding 15, a relatively small signal (noise) is induced in output winding 16 for a stored "1," and a relatively large signal for a stored "0."

Thus the magnitude of the output signal substantially depends on the direction of the interrogation field impressed, which makes it possible to employ the device for performing the EXCLUSIVE OR logical operation ($A\overline{B}$ V $\overline{A}B$) where A corresponds to the stored, and B—to the interrogation information.

However at a reversal of the interrogation current (at nondestructive reading) the amplitude of the first small signal (noise) is considerably greater than its stead-state value.

For this reason, in order to increase the signal-to-noise ratio for performing the logical operation $A\overline{B}$ V $\overline{A}B$ it is expedient to employ the two above described memory devices for one binary digit.

Figure 3:
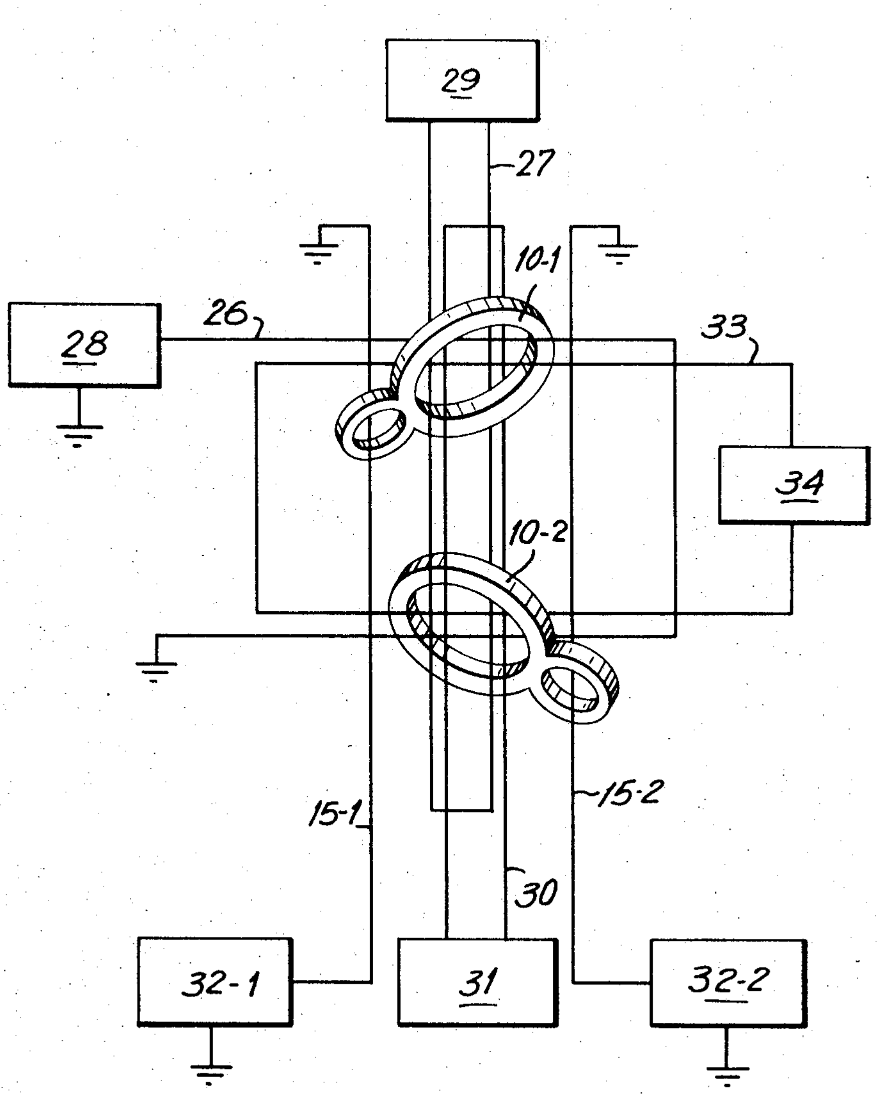

FIG. 3 shows an associative memory cell for one binary digit of information which uses two above described storage elements 10–1 and 10–2.

For destructive reading and writing use is made of windings 26 and 27 connected into which are destructive read-write generator 28 and writing generator 29 respectively.

The output signal is induced in winding 30 to whose circuit reading amplifier 31 is connected. Destructive reading and writing of information in this cell are effected in the same manner as in a two-core-per-bit cell of the linear-selection memory (LSM).

Nondestructive readout with interrogation to determine the correspondence with a "1" is effected by the current produced by a "1"—interrogating generator 32–1 and passed through winding 15–1. On the other hand, nondestructive readout with interrogation to determine the correspondence with a "0" is effected by the current from a "0"—interrogating generator 32–2, which is passed through winding 15–2. A relatively large signal appears in winding 33 only if the interrogation information is at variance with the stored data. The polarity of this output signal at any code of writing and interrogation is similar. Inserted into the circuit of winding 33 is a detector 34 which is energized by a mismatch signal.

A considerable increase of the output signal at nondestructive interrogation may be obtained by increasing the reversible component of magnetization when pulse or direct current prethreshold bias is passed through write winding 14 (FIGS. 1*a*, 1*b*). For this purpose, a separate winding may be used, which is to be arranged in the same manner as write winding 14.

Figure 4A:
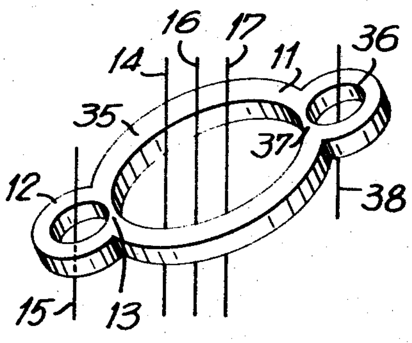

FIG. 4*a* shows a version of the invention which is essentially device 35 consisting of one central core 11 and two side cores 12 and 36 which have portions 13 and 37 common to the central core. The cross-sectional areas of all the cores and common portions are approximately equal. All the cores are situated in one plane.

If this device is to be used in memory systems with threshold writing it must be fabricated of magnetic material with a rectangular hysteresis loop. For purposes other than indicated above it is possible to use material with a nonrectangular hysteresis loop.

Information is written in the device by any of the known methods of writing in the same manner as in a conventional core made of magnetic material and having the dimensions of above-mentioned core 11. Write winding 14 passes through the aperture in core 11.

Destructive readout is effected by the current passed through winding 17.

Readout output signals are taken off from output winding 16 which is wound through the aperture in core 11.

For nondestructive data interrogation use is made of windings 15 and 38 which pass through cores 12 and 36 respectively.

Figure 4B:
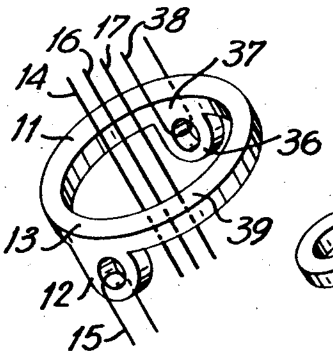

The invention is, however, not limited by the mutual location of the cores in one plane as shown in FIG. 4*a*. The invention being described includes also a version shown at 39 where the planes of cores 12 and 36 are perpendicular to the plane of core 11 while the axes of cores 12 and 36 intersect with the axis of core 11 at right angles, as shown in FIG. 4*b*. Windings 15, 14, 16, 17, 38 perform the same functions, as shown in FIG. 4*a*.

However, in this case interrogation windings 15 and 38 may be located perpendicular to output winding 16 which decreases the inductive coupling between these windings and, consequently, the magnitude of inductive noise in output winding due to the interrogation signal.

Figure 4C:
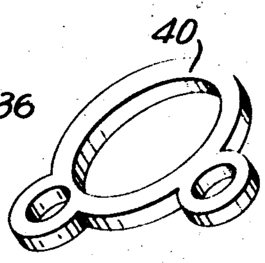

It should be noted, that both in FIG. 4*a* and in FIG. 4*b* the centres of cores 12 and 36 must not necessarily be in the same diametric plane of core 11. They may be placed in different diametric planes of core 11, that is, it is possible to use for example, version shown at 40 in FIG. 4*c* (the windings in FIG. 4*c* are not shown).

The operating principle of the element will be explained in FIG. 5 with the help of versions of the invention shown in FIG. 4*a*.

Figure 5:
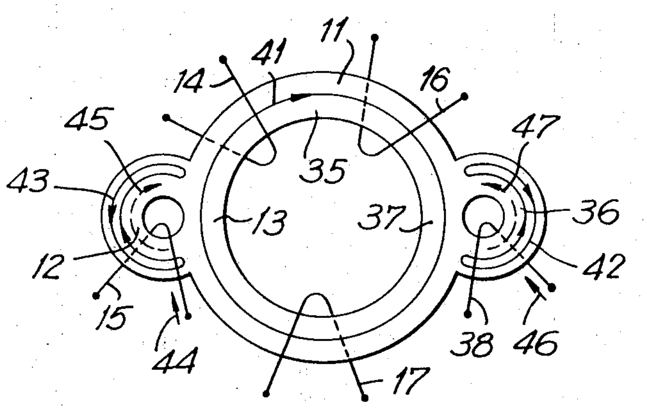
FIG. 5 shows a version of the device (FIG. 4*a*) and serves to explain its operating principle.

In FIG. 5 arrows 41, 42, 43 indicate the directions of residual magnetic fluxes in respective branches of device 35 upon termination of writing, for example, of a binary "1." Such distribution of fluxes is true under the same conditions as for the version shown in FIGS. 2*a*, 2*b*.

An applicaton of the interrogation current to winding 15 in direction shown by arrow 44 produces a flux which in core 12 has the direction indicated by dotted arrow 45. This flux fully closes around the aperture in core 12. The flux in core 11 practically does not vary as the direction of the field set up by the interrogation current coincides with the direction of the residual flux in core 11. In this case a relatively small signal (noise) is induced in output winding 16. Winding 15 may be interpreted as an interrogation winding designed to determine the correspondence with a "1."

An application of the interrogation current to winding 38 in direction shown at 46 produces a flux which flows in core 36 in the direction of arrow 47. This flux partially closes around the aperture in core 11, thereby weakening the residual flux in this core. This is due to the fact that the direction of the field set up by interrogate current in this core is opposite to the residual flux or, put in another way, core 11 has a high permeability. A weakening of the flux in core 11 results in a relatively large signal induced in output winding 16.

Winding 38 may be interpreted as an interrogation winding designed to determine the correspondence with a "0".

Interrogation currents passed through windings 15 and 38 do not destroy information in core 11.

In this case the same principle of nondestructive readout is used as in the case of the device shown in FIGS. 2*a*, 2*b*.

If, now a "0" is written in core 11, that is, residual flux shown at 41 is reversed, this results in a relatively large signal induced in output winding 16 in the case of interrogation to determine the correspondence with a "1," and a relatively small signal (noise) in the case of interrogation to determine the correspondence with a "0."

Thus, the device described above performs, at nondestructive reading, the EXCLUSIVE OR logical function $A\bar{B} \vee \bar{A}B$ where A corresponds to the stored, and B—to interrogation information.

This gives a sufficiently high ratio of the mismatch signal to the match signal.

In all the above described versions of the invention the cross-sectional areas of the cores and common portions are selected approximately equal because this gives a maximum signal-to-noise ratio in voltage at nondestructive data reading and very speed rise times of interrogate pulses. The resultant decrease in transmission coefficient $K=V_{out/in}$ (where $V_{out}$=output signal at nondestructive reading, $V_{in}$=voltage drop across the interrogation winding) is negligible.

Figure 6:
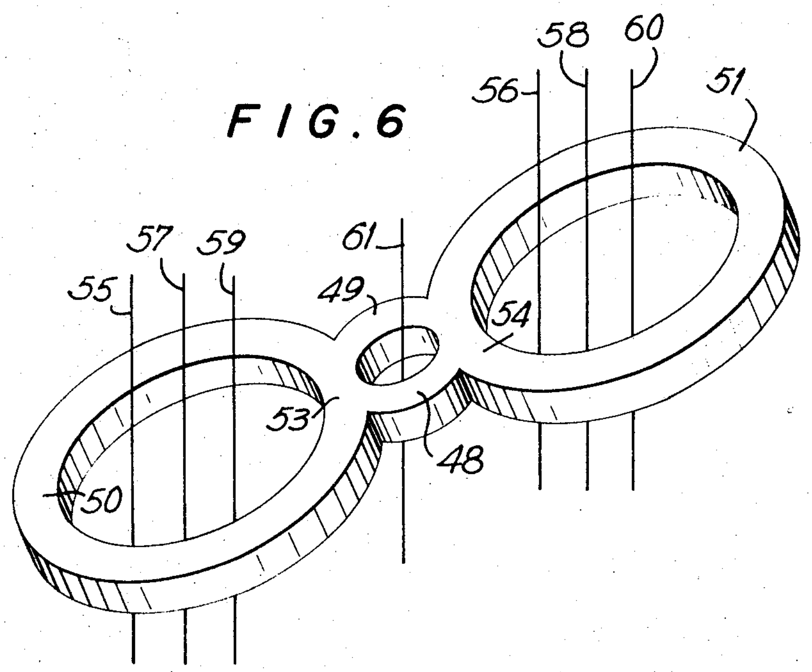
FIG. 6 shows another version of the invention.

Another version of the invention is shown in FIG. 6. It is essentially device 48 comprising one central core 49 and two side cores 50 and 51 with portions 53 and 54 common to the central core. Cross-sectional areas of all the cores and common portions are approximately equal. The core may be fabricated of magnetic material either with a rectangular or a nonrectangular hysteresis loop.

Side cores 50 and 51 are used here for writing information whereas central core 49 is used for nondestructive interrogation.

Write windings 55 and 56, destructive-interrogation windings 57 and 58, output windings 59 and 60 pass through the apertures in cores 50 and 51 respectively. Nondestructive interrogation winding 61 is passed through the aperture in core 49. The operation of the above described device is, to a a certatin degree, equivalent to the operation of two devices shown in FIG. 1*a*, which have one nondestructive-interrogation winding common to both storage elements.

This version of the invention is very convenient for use in the readout of codes "10" or "01," which is often necessary in memory systems with a distributed internal logic.

Figure 7:
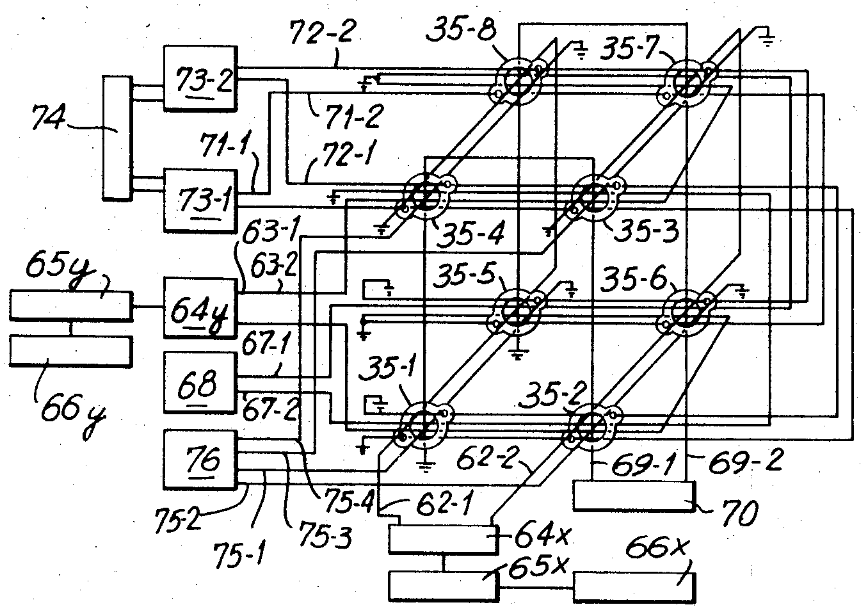
FIG. 7 shows an associate memory system using devices of FIG. 4*a*.

Memory devices with nondestructive readout which perform the logical operation $A\bar{B} \vee \bar{A}B$ are illustrated in FIGS. 4*a*, 4*b*, 4*c* and can be employed for designing an associative memory system shown in FIG. 7. Employed here are devices 35. A plurality of such devices is arranged in a three-coordinate array.

FIG. 7 shows a memory system for four words of two digits each. Cores 35–1, 35–2, 35–3, 35–4 form one digit plate of all words, cores 35–5, 35–6, 35–7, 35–8 form another digit plate.

The memory system can operate in two modes;

(a) writing and destructive reading of information at a definite address;

(b) associative information retrieval according to a definite associative criterion.

When operating in the first mode, the memory system functions as a conventional coincident currents memory (CCM).

For destructive readings and writing use is made of windings 62–1 and 62–2 in the X plane and of windings 63–1 and 63–2 in the Y plane. The required pair of windings is selected with the aid of read-write drivers **64*x* and 64*y*, decoding arrays 65*x*, 65*y*, address registers 66*x* and 66*y***.

For writing use is also made of inhibition windings 67–1 and 67–2 with respective inhibition drivers 68 (one per binary digit). Output windings 69–1 and 69–2 pass in series through all storage elements of two digit plates respectively. Connected in their circuits are reading amplifiers 70 (one per binary digit).

For nondestructive data interrogation at associative retrieval use is made of interrogation windings 71–1 and 71–2 (for interrogation to determine the correspondence with "1") and 72–1 and 72–2 (for interrogation to determine the correspondence with "0"). Each pair of windings 71–1 and 72–1, 71–2 and 72–2 passes in series via all storage elements of each digit plate respectively. Interrogation currents are produced by interrogation generators 73–1 and 73–2 controlled by associative register 74. At each given moment any of the storage element can be interrogated to determine the correspondence with "1" or with "0." Nondestructive interrogation may be effected either in series by digits (digit plates being interrogated in series) or in parallel (all digit plates being interrogated simultaneously.

If stored information in some storage element does not correspond to the interrogation data a mismatch signal appears in one of detector windings 75–1, 75–2, 75–3, 75–4 as each storage element performs operation $A\bar{B} \vee \bar{A}B$. The detector windings pass in series through all storage elements of one word respectively.

The circuit of each detector winding contains a detector which is energized by a mismatch signal supplied. All detectors form detector array 76. To compensate for noises in the detector windings due to destructive readout and writing, each detector winding passes through adjacent cores in antiphase. After nondestructive interrogation of all digit plates the detectors whose words are at variance with the associative criterion (i.e. with interrogation information) change their states. Now it is necessary to find out detectors which have not changed their states and select from the memory respective words or their addresses. Arrangements and devices fit for the purpose are known in the art.

Although the present invention is described with reference to the preferred embodiment thereof, it is to be understood that modifications and versions are possible, without departing from the spirit and scope of the invention which will be readily understood by those skilled in the art.

These modifications and versions are considered to be in conformity with the spirit and scope of the invention and the appended claims.

What is claimed is:

1. A magnetic logical memory device at nondestructive readout, consisting of a storage element comprising at least two cores having a common portion, said storage element being fabricated of magnetic material capable of assuming two different stable remanence states, said cores having cross-sectional areas approximately equal to that of said common portion; write, destructive-interrogation and output windings passing through the aperture of one of said cores and; a non-destructive interrogation winding passing through the aperture of the other of said cores.

2. A magnetic logical memory device at nondestructive readout consisting of a storage element comprising two cores having a common portion and disposed in one plane, said cores being fabricated of magnetic material capable of assuming two different stable remanence states and having cross-sectional areas approximately equal to that of said common portion; write, destructive-interrogation, and output windings passing through the aperture of one of said cores and; a nondestructive interrgation winding passing through the aperture of the other of said cores.

3. A magnetic logical memory device at nondestructive readout consisting of a storage element comprising two cores having a common portion and situated in planes perpendicular with respect to each other, said cores being fabricated of magnetic material capable of assuming two different stable remanence states and having cross-sectional areas approximately equal to that of said common portion; write, destructive-interrogation and output windings passing through the aperture of one of said cores and; a nondestructive-interrogation winding passing through the aperture of the other of said cores.

4. A magnetic logical memory device at nondestructive readout consisting of a storage element which comprises two cores having a common portion and fabricated of magnetic material capable of assuming two different stable remanence states, said cores having cross-sectional areas approximately equal to that of said common portion; write, destructive-interrogation, prethreshold-bias and output windings, passing through the aperture of one of said cores and; a nondestructive-interrogation winding passing through the aperture of the other of said cores.

5. A magnetic logical memory device, capable of storing one bit of information and performing EXCLUSIVE OR logical operation, at nondestructive readout consisting of a storage element comprising at least three interconnected cores of which one is central, and the rest are side cores connected with said central core by common portions, said cores being fabricated of magnetic material capable of assuming two different stable remanence states and having cross-sectional areas approximately equal to those of said common portions; write, destructive-interrogation and output windings passing through the aperture of the central core and; nondestructive-interrogation windings each passing through the respective aperture of said side cores.

6. A magnetic device, according to claim 5, in which all said cores are situated in one plane.

7. A magnetic device, according to claim 5, in which at least one side core is situated in the plane perpendicular to that of the central core.

8. A magnetic logical memory device with nondestructive readout consisting of a storage element comprising at least three interconnected cores of which one is central, and the rest of said cores are joined with the central core by common portions, said cores being fabricated of magnetic material capable of assuming two different stable remanence states and having cross-sectional areas approximately equal to those of said common portions; a nondestructive interrogation winding passing through the aperture of said central core and; write, destructive-interrogation and output windings, each passing through the respective apertures of said side cores.

9. A magnetic device, according to claim 8, in which all said cores are situated in one plane.

10. A magnetic device according to claim 8 in which at least one of said cores is situated in a plane perpendicular to that of the central core.

11. A memory system comprising a plurality of magnetic storage devices, according to claim 5, fabricated of material with an essentially rectangular hysteresis loop and arranged in rows, columns and groups (each group serving to store one word of information), said system consisting of means for writing which are connected with lines forming rows and with columns which pass through central apertures of said storage devices corresponding to individual rows and columns; output means which are connected with lines which pass through central apertures of all said storage devices in each digit of said words in such a manner as to compensate for the signal due to a half of the writing and reading currents flowing through the selected columns and rows; inhibiting means connected with inhibiting lines which pass through central apertures of all said storage devices in one digit of all words; means for comparing the stored information with the interrogation information which are connected with two lines, first of which lines passes exclusively through one side aperture of all said storage devices in each digit of all words and performs a comparison for the coincidence with a binary "1", the second of said lines passing exclusively through other apertures of all said storage devices in each digit of all words and performing a comparison for the coincidence with a binary "0"; output detector means including output lines, each passing through central apertures of all said storage devices of exclusively each of said words and determining the correspondence of the interrogation and stored information by the presence or absence of a signal.

References Cited

UNITED STATES PATENTS

| | | | |
|---|---|---|---|
| 3,245,059 | 4/1966 | Eiseman et al. | 340—174 |
| 3,314,055 | 4/1967 | Higgins, Jr. | 340—174 |
| 3,056,117 | 9/1962 | Booth | 340—174 |
| 3,212,068 | 10/1965 | Vinal | 340—174 |

OTHER REFERENCES

Test: "Digital Applications of Magnetic Devices," by Meyerhoff et al., John Wiley & Sons, Inc.

STANLEY M. URYNOWICZ, JR., Primary Examiner

U.S. Cl. X.R.

307—88